United States Patent
Jensen

[11] Patent Number: 5,929,455
[45] Date of Patent: Jul. 27, 1999

[54] METHOD AND APPARATUS FOR DESTRUCTION OF UNDESIRED VEGETATION USING ULTRA-VIOLET LIGHT

[75] Inventor: Kaj Jensen, Lyngby, Denmark

[73] Assignee: Niels Lang Mathiesen and Knud Andreasen, Denmark

[21] Appl. No.: 08/750,299

[22] PCT Filed: Jun. 2, 1995

[86] PCT No.: PCT/DK95/00218

§ 371 Date: Dec. 5, 1996

§ 102(e) Date: Dec. 5, 1996

[87] PCT Pub. No.: WO95/33374

PCT Pub. Date: Dec. 14, 1995

[30] Foreign Application Priority Data

Jun. 6, 1994 [DK] Denmark .................. 0635/94

[51] Int. Cl.[6] .................. G05D 25/02
[52] U.S. Cl. .................. 250/492.1; 250/455.11
[58] Field of Search .................. 250/492.1, 504 R, 250/455.11, 454.11, 453.11

[56] References Cited

U.S. PATENT DOCUMENTS

| | | | |
|---|---|---|---|
| 4,595,838 | 6/1986 | Kerschgens | 250/504 R |
| 5,395,591 | 3/1995 | Zimlich, Jr. et al. | 250/492.1 |
| 5,744,094 | 4/1998 | Castberg et al. | 250/492.1 |

FOREIGN PATENT DOCUMENTS

| | | |
|---|---|---|
| 418453 | 3/1991 | European Pat. Off. . |
| 4100221 | 7/1992 | European Pat. Off. . |
| 026248 | 4/1981 | Germany . |
| 2306061 | 4/1981 | Germany . |
| 4140553 | 6/1993 | Germany . |

OTHER PUBLICATIONS

D. Hansson, et al., "Keeping weeds down without herbicides", *Real Business Report*, 1995, pp. 36–37.

*Primary Examiner*—Kiet T. Nguyen
*Attorney, Agent, or Firm*—Ostrolenk, Faber, Gerb & Soffen, LLP

[57] ABSTRACT

A method for control of vegetation at places where said vegetation is undesirable, said method comprising intense irradiation of the vegetation for one or several periods by light, of which at least 10% of the effect is ultra-violet light, the total irradiation dosage (joule/m$^2$) exceeding a minimal value necessary for the intended vegetation control. An apparatus for performing the method comprises at least one light source directed towards the undesired vegetation and emitting at least 10% of its light discharge in the ultra-violet range, said apparatus comprising means which after discharge of an irradiation dosage surpassing the minimal value necessary for the intended vegetation control discontinue the treatment of the areas in question.

16 Claims, 1 Drawing Sheet

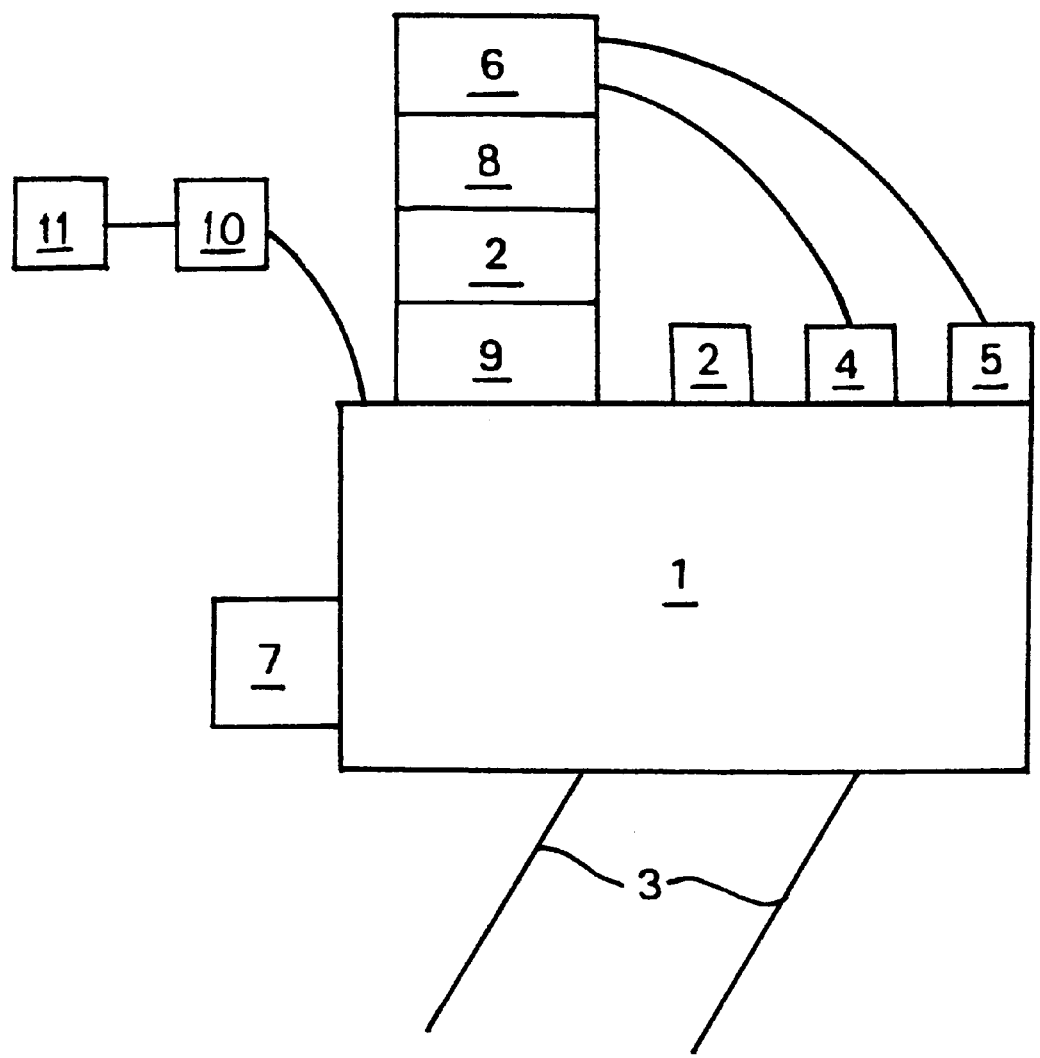

METHOD AND APPARATUS FOR DESTRUCTION OF UNDESIRED VEGETATION USING ULTRA-VIOLET LIGHT

BACKGROUND OF THE INVENTION

The present invention relates to a method for controlling vegetation, where vegetation is undesirable. Furthermore, the invention relates to an apparatus for performing said method.

By control of vegetation is in this context to be understood a limitation of vegetation which may both comprise weed control, stopping growth of plants and growth-retardation of plant. Such a control has hitherto to a great extent been performed by chemical sprays, where there has been no possibility of or resources for a mechanical removal or control of plant growth. Another used method for weed control or for limiting the growth thereof has been to subject it to heat from a gas burner frying the leafage of the plants.

Control of undesirable vegetation by chemical sprays is effective and cheap, but occasions severe worry on account of the risk of percolation through the ground and contamination of the subsoil water. The percolation is in particular considerable on railway track beds, where crushed rocks and lack of vegetation constitute a kind of cesspool. As during the last 100 years comprehensive railway systems with an underlayer of crushed rocks have been built, the load carrying ability of which requires a complete removal of vegetation, the risk of chemical sprays has had to be accepted. The railway authorities have, however, in an attempt to avoid chemical sprays looked for alternative methods, including irradiation with electromagnetic waves in the lower end of the electromagnetic spectrum through tests with radio waves, micro waves and rays of heat. The plant parts are, however, so small and thin that none of these wave lengths has especially good possibilities of discharging sufficient energy to influence the plants. On the contrary, the major part of the energy passes through the plants and down into the crushed rocks and soil, where the energy is transformed into heat. Moreover, these electromagnetic waves spread along tracks and wires at the track bed and electronic installations, which are damaged, as energy dosages have to be used which correspond to those emitted by the biggest known radio transmitters. The burning of electronics and cables is expected to happen with such a force that there is a risk of fire around the electric installations.

Other alternative methods may be spraying with steam or boiling water, which requires very huge amounts of energy, as well as frying with gas burners, which will likewise require huge amounts of energy and constitute a great danger of leaf fire and thermal damages to cables. None of these methods are therefore widely used in general, and not for vegetation control along railway lines either.

The object of the invention is on this background for use in vegetation control to provide a method which does not entail the risk of percolation of chemical compounds and which can be performed with a moderate consumption of energy.

DESCRIPTION OF THE INVENTION

The invention is based on the observation that the energy of ultra-violet light contrary to more long-waved light is absorbed in a thin surface layer of biological materials which are irradiated. Measurements of grass and green leaves show that very little ultra-violet light is reflected and transmitted, so that nearly the whole energy (approx. 90%) is transformed into heat in the outermost 0.1 mm. These conditions apply to both UVA-, UVB-, and UVC-light. The effective energy consumption means that it is possible with a comparatively short, intense irradiation to transfer so much energy to the leaves of the plant that the green plant parts are destroyed. In this connection, it is a question of a irradiation dosage which exceeds a minimum dosage which the plant can survive without substantial damage.

According to the invention this minimum dosage is experimentally determined, as it has turned out that this dosage may be composed of several shorter or less intense irradiation periods or may consist of one single, more strong or longerlasting dosage. For a given light source, several sets coherent values for irradiation periods, number of repetitions of irradiation and periods between subsequent radiations may thus be determined. Normally, a single irradiation of sufficient durability and intensity for carrying through the vegetation control is, however, preferred. According to the invention the irradiation is carried out with high light intensity and short irradiation period, preferably less than 10 seconds, in particular less than 3 seconds.

It is particularly advantageous that part of the light is discharged in the UVC-range, because plants do not have any natural defence towards such an irradiation. UVC-light therefore has a particularly efficient effect which is based on other effects than just a heating of the leaves.

The method according to the invention is effective in control of vegetation in places where the risk of contamination with spraying agents cannot be taken and where room can be found for passing a strong light source with a substantial content of ultra-violet light over the vegetation. The method is applicable for keeping path areas clean, for control of competing plants under and between plants, for use in the kitchen and in particular for control of vegetation along railway tracks.

Moreover, the invention relates to an apparatus for performing the method.

The simplest designs of the apparatus according to the invention are based on the apparatus being advanced over the area, where the vegetation control is to take place, at such a speed that the necessary dosage is discharged during the passage. The more intense the energy from the light source, the more quickly can the light source be moved. This condition is in particular utilized for vegetation control along railway lines, where the railway track itself is utilized for advancing the light source, and where surplus energy from the engine delivering the tractive force may be used for operating the light sources.

The invention will be described in detail in the following with reference to calculation examples showing preferred embodiments.

The invention resides in an observation of the absorption of light energy in biological material. To get a frame of reference, one might examine the light from the sun shining down on the surface of the earth. The average value for global radiation per square meter is in a CIE-norm by Brener stated as follows:

490 watt infrared light which can be transmitted through thin material but which heats up objects like for instance human beings. An infrared remote control unit, for instance a television, is not disturbed if a green leaf is held up in front thereof. If the leaf, however, substituted by the hand of a human being, the signal disappears, said signal being transformed into heat in the hand. Approx. 70% of the infrared light is reflected from the surface of green plants, which can be seen in an infrared binocular or from infrared television shootings, where green plants appear with a very high visual intensity. The absorbed part of the infrared light—the light which is neither reflected from the surface of the plant or transmitted through the plant, is therefore very small (approx. 10%), for which reason infrared light is not suited for heating up plants with a view to destroying them.

580 watt visible light, which is the energy supply of the plants to the photosynthesis. Approx. 10% of the visible light is reflected from the surface of the plant, whereas approx. half of the remaining part is absorbed on a thin leaf. Visible light is, therefore, well suited for the heating of plants, the absorbed part of visible light being approx. 50%.

44 watt ultra-violet UVA-light which borders on visible violet light and is known from solariums and sunbathing. Though it is not a question of that many watts, our skin easily gets warm at the surface, and greater amounts of UVA-light give sun-scorching. This is due to the fact that nearly all the energy of ultra-violet light is absorbed on the surface of the skin in a depth of approx. 0.1 mm. Measurements of grass and green leaves show that very little ultra-violet light is reflected and transmitted, so that nearly all the energy (approx. 90%) is transformed into heat in the uppermost 0.1 mm. This applies to both UVA-, UVB- and UVC-light, which is thus particularly suited for the heating of plants.

4 watt ultra-violet UVB-light, which is slightly more short-waved than UVA-light and is known from sunbathing, where even small amounts give a reddening of the skin and activate the colour pigments of the skin. The small amount of UVB-light which reaches the surface of the earth, is due to the fact that the ozone layer in the higher atmospheric layers filters off UVB-light. Tests show that an increase of the amount of UVB-light reduces the growth of plants. Tests of plants at high altitudes on mountain sides of Hawai, where there is somewhat more UVB-light, have, however, shown that the plants to a certain degree can adjust to UVB-light.

0 watt ultra-violet UVC-light which is the most short-waved form of ultra-violet light, is known from the fight against bacteria in drinking water as well as from sunlight outside our atmosphere. The oxygen in the atmosphere filters off UVC-light, so neither animals or plants are used to the existence of these light beams on the earth. If you go from UVC-light further down in wave length, you get into the X-ray range, which is not used in the present invention.

Low pressure mercury vapour lamps emit a strong light with a wavelength of 254 nm in the middle of the UVC-range, where bacteria and vira are most sensitive to irradiation. It is known that a dosage of 100 joules per square meter is sufficient for removing vira and small bacteria, whereas 1000 must be used for removal of big bacteria and approx. 5000 for algae.

In connection with the present invention tests have been made with green plants, where a dosage of 10,000 joules per square meter stops or retards growth dependent on the type and size of the plant. In respect of small grass sprouts, this dosage is sufficient for making the grass sprouts start bending away from the light or curl together after one day and wilt after a couple of days. It should be noted that the plants have not simultaneously been subjected to heat or any other kind of light, apart from natural daylight.

As it is not economical to produce pure UVC-light in huge quantities, testing equipment has also been made in connection with the present invention, said equipment primarily emitting a mixture of UVC, UVB and UVA light and as a "by-product" emitting visible light as well as infrared light. This equipment transfers energy in form of supplied from a 230 volt socket through an electronic circuit for ignition and operation of a vapour lamp (electronic ballast) as described in DK-B-167,992 for a 1000 watt vapour lamp. From this approx. 16% of the energy is irradiated in form of UVC light, approx. 7% as UVB light, approx. 7% as UVA light, approx. 14% as visible light, approx. 35% as infrared light and the rest, approx. 21%, as heat in electronics, reflector and lamp. The part of the light energy which is in the ultraviolet range, i.e. approx. 30%, is transformed most effectively to heat in the green leaves of the plants, as very little is reflected or transmitted through the leaves.

If an area of 1 square meter is irradiated, said area being covered by thins leaves of 0.1 mm, half of which is aqueous phase, the plant contains 1 m*1 m*0.05 mm water, i.e. 0.05 liter or 50 gram water. If 1 gram of water is heated 1 degree, 1 cal. or 4.18 joules is/are required. 50 gram water, distributed in the thin leaves, is heated correspondingly 1 degree by supply of 209 joules. If an energy dosage of for instance 10,000 joules is supplied, the leaves are correspondingly heated 48 degrees. Is the ambient temperature 22 degrees, the temperature of the leaves reaches 70 degrees, which makes heat damages starting to occur.

For use on a railway carriage, a number of units may be built together. If a carriage 20 meter long and of a width of 4 meter is irradiated, a total of 80 square meters is irradiated. With the same light intensity as in the testing equipment, it requires 35 kwatt*80=2.8 mwatt. This effect corresponds to known diesel electric engines, but the electric energy may also be supplied from overhead wires in electrified lines.

The rate of advance is in respect of 10,000 joules UV-light per square meter 1 second for a carriage length of 20 meters, i.e. (20 meters*3600 seconds)–72 km per hour. For 30,000 joules UV light per square meter the speed gets correspondingly three times less, i.e. 24 km per hour.

The speed may be increased proportionally with an increase of the effect. If the size of the light carriage is increased to 3 mwatt, the rate of advance at 10,000 joules per square meter is increased to 77 km per hour, and the speed at 30,000 joules per square meter to 26 km per hour.

Both the rate of advance and requirements to the size of the engine lie within the practical possibilities for railway operations. Moreover, it is possible to increase the speed to normal traffic speed (for instance 150 km per hour) on busy lines, if you refrain from using the part of the effect of the equipment which stems from the heating of the plant. Supplementary tests with integration of many small dosages of cold UVC light at 254 nm show that for instance 6 small dosages distributed over 3 days have the same effect as the entire dosage at a time.

The direct operational costs at an average speed of 50 km per hour and a production price per kilowatt hour of DKK 0.25 is: 3 megawatt*DKK 0.25/kilowatt, i.e. 750 DKK per hour. With a salary to the engine driver of 250 DKK per hour and 500 DKK per time provided for lamp exchange, the direct operational costs amount to approx. DKK 1500 per hour. The irradiated area is per hour 50 km*4 meters width, i.e. 200,000 square meters. The direct operational costs per square meter are thus of the order of DKK 1500/200,000, i.e. approx. DKK 0.0075 per square meter.

An operational cost of under DKK 0.01 per square meter is economically advantageous compared to the operational costs for sprays.

In vegetation control along railways it is, however, not only in the ballast of crushed rocks, on which the tracks rest, vegetation is to be controlled, but in particular an area immediately next to the ballast of crushed rocks, where the vegetation spreads inwards towards the ballast. There may therefore be a need for part of the light sources being movable in a horizontal plane laterally relative to the direction of travel. This part of the light sources is, when passing platforms and other narrowings of the structure gauge limits, to be inwardly retractable and to be able to resume their position again when there is room and need for an irradiation of a wider area. Particularly the part of the light batteries which are placed uttermost, needs an effective light control, as reflected or scattered lighting with a large content of UV light is harmful to the eyes of humans or animals looking at this light. It is, therefore, preferable, in particular at the light sources along the edges of the lamp pattern, in addition to the other precautionary measures damping the light emission, if a strong light reflection is registered, to provide means for controlling light emission with wavelengths under approx. 250 nm.

Safety equipment

The light sources are provided with electronic circuits for ignition and operation of the gas discharge lamps. If this circuit is designed according to DK-B167,992, it may lower the effect within a ten thousandth part of a second. Such a connected safety equipment may therefore start functioning immediately so that potential dangerous situations are avoided. The light intensity may for instance automatically be lowered, when the train reduces its speed. Thereby, energy is saved, and the risk of fire in paper along the track bed is avoided. This corresponds to the train driving under 4 km per hour with full light intensity. The automatic safety equipment may for instance be set to always lower the light intensity at a speed under 16 km per hour.

Though the reflection from plants and the track bed is very little, particularly in the ultra-violet range, where the sensitivity of the eye to harmful influence is large, there may for instance be reflecting metal parts or glass along the track bed. Thus, it is necessary to mount light-sensitive sensors along the sides of the light carriage, said sensor registering light which is reflected and which may hit persons standing a few meters from the track bed. The light is adjusted according to prevailing set limits in the electromagnetic spectrum, and the electronics instantly reduce the light intensity so quickly that the set limits will not be surpassed.

If there are places along the line which require preventive intervention in view of safety, for instance passage over bridges which are not sufficiently shielded against light at the sides, the light may be correspondingly electronically lowered, for instance from signals positioned along the line or from a computer with a map of the route as well as a satellite receiver indicating the position of the train on the map. Such an equipment may among others also control the dosage of light along the route, which is particularly useful, if the speed has to be increased to normal travel speed, when other trains approach. Also ozone sensors must be arranged, as ozone in large amounts attack eyes and lungs. If the concentration of ozone reaches the limit value around the carriages or in the driver's cabin, the light is correspondingly reduced in order not to exceed the limit values. Ozone is generated from oxygen, which is irradiated with short-wave UVC-light around 185 nm, and turns into oxygen again when irradiated by UVC-light around 254 nm. The light carriage therefore has good possibilities of limiting itself the ozone concentration by a suitable lay out, possibly supplemented with large ventilators. The development of ozone may also be limited by a suitable choice of glass for the lamps, whereby the part of the UVC-light below approx. 250 nm being most short-waved is filtered off and is lost instead in form of heat in the glass. This type of filtered light may be used along the edge of the light carriage, ozone on its way being irradiated by 254 nm and transformed into oxygen.

The above tests and rough estimates in respect of dimensions have been made on basis of the spectrum of the known mercury-filled high pressure lamps. The mercury content may occasion worries with respect to mercury leakage if a lamp is dropped or—in the worst case—by collision. However, other fillers are available, for instance antimony, which gives an even bigger UVC-share.

The sole FIGURE shows aspects of the apparatus. A movable railway carriage 1 having light sources 2, such a high energy light source or gas discharge lamp, rides on railroad tracks 3. An ozone sensor 4 and an ultra-violet light sensor 5 are connected to a control or means for discontinuing radiation 6. Carriage 1 is provided with a drive 7 and the light source is provided with a ballast 8 and a filter 9. Also provided is a registration means 10 and a computer 11.

I claim:

1. A method for control of vegetation at sites where said vegetation is undesirable which comprises intensely irradiating said sites with light of which at least 10% is ultra-violet light, wherein the total irradiation (joule/m$^2$) is sufficient to realize the intended vegetation control.

2. The method according to claim 1 including the step of experimentally determining said sufficient amount of total irradiation in the form of a coherent value set for a given light source, the time of irradiation, the number of repetitions of irradiation and the time between subsequent irradiations.

3. The method according to claim 1 in which at least 5% of the light is within the UVC-range.

4. The method according to claim 1, wherein the irradiation is effected from a high light intensity source and is applied for a short exposure period.

5. The method of claim 4, wherein the period of exposure is less than 10 seconds.

6. The method of claim 5, wherein the period of exposure is less than 3 seconds.

7. A method of claim 1, wherein the site at which said vegetation is undesirable is a railway track, the irradiation is effected with at least one gas discharge lamp directed toward said site and mounted on a movable railway carriage and wherein the railway carriage is moved at a speed which permits application of said sufficient amount of total irradiation.

8. The method of claim 7, wherein the output of the gas discharge lamp is controllable and said output is controlled as a function of the travel speed of the movable railway carriage.

9. A method according to claim 1, wherein a source of the light irradiation is connected to an ozone sensor and a UV light sensor through a control, and the control is set to lower the level of irradiation when at least one of said sensors exceeds a predetermined threshold.

10. An apparatus for retarding vegetation in a site and which it is not desired comprising at least one irradiation light source disposed to irradiate said site and which emits at least 10% of its light discharge in the ultra-violet range in combination with means to discontinue irradiation of said site when the total irradiation (joule/m$^2$) surpasses a predetermined value.

11. The apparatus of claim 10, wherein said irradiation light source is mounted on a movable carriage which includes drive means for moving the carriage at a speed such that said predetermined total irradiation is achieved at a given site.

12. The apparatus according to claim 10, wherein the irradiation light source is a plurality of substantially downwardly directed gas discharge lamps mounted on a movable railway carriage such that light is directed approximately vertically downward.

13. The apparatus according to claim 12, wherein at least one lamp is disposed so as to irradiate an area outside the width of the carriage.

14. An apparatus according to claim 12, further comprising an electronic, high-frequency ballast for momentary control of discharge light intensity coupled to at least one gas discharge lamp.

15. An apparatus according to claim 12, wherein at least one lamp has a filter which reduces light discharge at wavelength smaller than 250 nm.

16. An apparatus according to claim 10, further comprising a registration means to register the light dosages discharged by the source of irradiation and provided with a computer.

* * * * *